US012761085B2

United States Patent
(12) United States Patent
Bressanutti et al.

(10) Patent No.: US 12,761,085 B2
(45) Date of Patent: Oct. 13, 2026

(54) RESPONSE OF HEAT DETECTORS WITH SURFACE MOUNTED THERMISTORS

(71) Applicant: Honeywell International Inc., Charlotte, NC (US)

(72) Inventors: Massimo Bressanutti, Sesto al Reghena (IT); Daniele Iurissevich, Trieste (IT); Borut Jogan, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 365 days.

(21) Appl. No.: 18/520,854

(22) Filed: Nov. 28, 2023

(65) Prior Publication Data

US 2025/0172436 A1 May 29, 2025

(51) Int. Cl.
*G01K 3/14* (2006.01)
*G01K 7/22* (2006.01)

(52) U.S. Cl.
CPC ................ *G01K 3/14* (2013.01); *G01K 7/22* (2013.01)

(58) Field of Classification Search
None
See application file for complete search history.

(56) References Cited

U.S. PATENT DOCUMENTS 6,390,081 B1 * 5/2002 Novak ................ F02D 41/1402 60/277
2016/0356652 A1 * 12/2016 Yun ....................... G01J 5/0802
2020/0041354 A1 * 2/2020 Ide ........................... G01K 1/16
2020/0054905 A1 * 2/2020 Livchak ................. G08B 13/19
2021/0053819 A1 * 2/2021 deKoninck ............ G01L 19/04
2022/0358820 A1 11/2022 Muro
2023/0093605 A1 3/2023 Chiatti et al.

FOREIGN PATENT DOCUMENTS

CN 103869151 6/2014
DE 202019001963 6/2019
EP 3937145 A1 1/2022
JP 2020061122 A 4/2020
WO 2022127628 6/2022

OTHER PUBLICATIONS

Zaporozhets, et al., "Using Artificial Neural network for Compensation of Semiconductor Thermistor Nonlinearity", Sep. 2019, 4 pgs.

* cited by examiner

*Primary Examiner* — Erica S Lin
(74) *Attorney, Agent, or Firm* — Brooks, Cameron & Huebsch, PLLC

(57) ABSTRACT

Devices, systems, and methods for providing point heat detectors based on surface mounted thermistors are described herein. One point heat detector of a fire sensing system, includes a circuit board body having number of corners, at least two surface mounted thermistors, each thermistor mounted on different ones of the corners, an intermediate position between two of the surface mounted thermistors, and a processor that executes instructions stored in memory to determine a temperature for at least one of the two surface mounted thermistors and the intermediate position.

20 Claims, 4 Drawing Sheets

RESPONSE OF HEAT DETECTORS WITH SURFACE MOUNTED THERMISTORS

TECHNICAL FIELD

The present disclosure relates to devices, systems, and methods for providing improved response of heat detectors with surface mounted thermistors.

BACKGROUND

Facilities (e.g., buildings), such as commercial facilities, office buildings, hospitals, and the like, may have a fire detection system that can be triggered during an emergency situation (e.g., a fire) to warn occupants to evacuate. For example, a fire detection system may include a fire alarm control panel within the building and a plurality of point heat detectors located throughout the facility (e.g., on different floors and/or in different rooms of the facility) that can sense a heat condition indicative of a fire occurring in the facility and provide a notification of the heat condition to the occupants of the facility and/or building monitoring personnel via alarms or other mechanisms.

Point heat detectors for fire detection systems typically sense when a temperature rises above a threshold. When this occurs, the point heat detector can send a signal to a control unit (e.g., within the point heat detector housing or at a fire system control panel) that can analyze the signal to determine whether to initiate an alarm (e.g., indicating a fire maybe occurring in the space being monitored by the detector device) or send an alert to other devices.

Point heat detectors use one or more thermistors that sense the temperature at the location of the point heat detector. Because the thermistors are positioned within a point heat detector housing, the thermistors have little ability to detect a direction that fire or smoke may be originating from.

DETAILED DESCRIPTION

Figure 1:
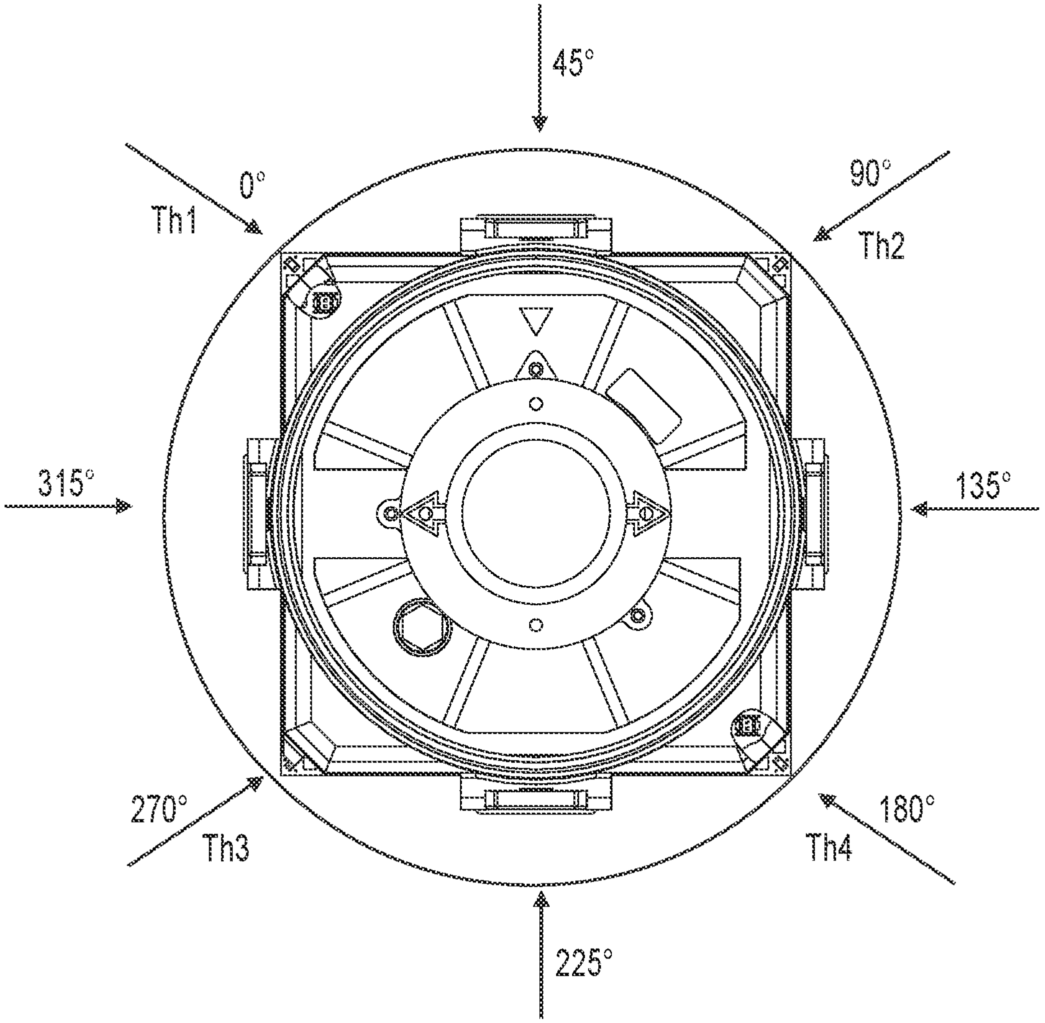
FIG. 1 is a bottom view of a point heat detector system with an outer cover and the detector cap removed that shows the corners of a circuit board with surface mounted thermistors provided therein, in accordance with one or more embodiments of the present disclosure.

Devices, systems, and methods for providing improved response of heat detectors with surface mounted thermistors are described herein. One heat detector of a fire sensing system embodiment of the present disclosure, includes a circuit board body having number of corners, at least two surface mounted thermistors, each thermistor mounted on different ones of the corners, an intermediate position between two of the surface mounted thermistors, and a processor that executes instructions stored in memory to determine a temperature for at least one of the two surface mounted thermistors and the intermediate position.

A surface mounted thermistor based solution, as disclosed herein, provides good sensing performance, can determine an estimated direction of a heat source, and will overcome other issues with prior designs, as discussed herein. This can be beneficial, in part, because surface mounted thermistors are cheaper than lead-type temperature sensors. The manufacturing process can also be simplified as the surface mounted thermistors can be installed during the circuit board manufacturing process, thereby eliminating the separate manufacturing steps used in prior designs.

Additionally, the positioning of the thermistors at the edge of the housing or protruding out of it allows each thermistor to sample ambient air proximate to that thermistor's location. Further, novel directionality processes and temperature estimation technique embodiments are also taught herein.

One example of the heat detector embodiments of the present disclosure includes a heat detector device having a point type heat detector that uses surface mounted thermistors, such as four surface mounted NTC (negative temperature coefficient) thermistors that are placed on the corners of a polygonal circuit board or on a circular circuit board, (e.g., spaced by) 90°. In various embodiments, the thermistor sensors can be spaced angularly around a center point of the circuit board at intervals (e.g., such as at regular intervals such as every 90 degrees, every 45 degrees, etc.). These positions are sometimes referred to as corners, as used herein, as they represent corners of a polygon. When used on a circular circuit board, the perimeter of the circle can circumscribe the corners of the polygon formed within the circle by the positions of the spaced thermistor sensors.

A phenomenon called directionality creates inaccurate sensing data due to the position that the thermistor is located relative to the detector device itself. Such a multi-sensor design reduces directionality problems in the heat detector, among other benefits.

This is because, having thermistors spaced from each other and/or at angles to each other, allows the air flow to be sensed from different locations and/or directions around the point heat detector device and, thereby, the direction of a heat source can be inferred and can be taken into consideration in determining whether to initiate an alarm. This data can also be used to determine a likely direction of a heat source with respect to the location of the heat detector device. For example, if a first thermistor senses an air flow change (e.g., heat source induced change in air flow) and then a second thermistor at another location senses an air flow change, the direction of the source of the air flow change can be inferred (e.g., the source may be located between the two thermistors sensing air flow changes).

Further, if the thermistors sense air flow entering the outer housing of the detector device from different directions, the sensing of heated air flow, or by one thermistor and not another these can also be indicative of which direction the heat source is located.

The effects of directionality can be further reduced by utilizing a proportional integral observer (PIO) process for each thermistor. For example, as described herein, the effects of thermal inertia can be counteracted by an observer process, for example, a PIO process. Specifically, the PIO process can be used to estimate the air flow temperature using a temperature measured by a thermistor and a model of the air flow-heat detector system.

The PIO itself does not reduce directionality but compensates for thermal inertia. For example, in a four thermistor implementation, the application of four different PIO models each to a different one of the four thermistors reduces directionality because it takes into account different mechanical configurations.

Due to the lower profile of embodiments of the present disclosure, the circuit board with surface mounted system can be placed in a low-profile housing with a mechanical configuration designed to effectively direct air flow toward the surface mounted thermistors. With a surface mounted thermistor-based embodiment, as disclosed herein, fire system devices with point heat detectors designed therein (generally referred to herein as heat detector devices) can be manufactured with integrated thermal detection including, for example, thermal, photo-thermal, multicriteria (e.g., COPTIR) detectors, with a lower profile (and consequently better aesthetics) at a lower cost. A COPTIR device combines four separate sensing elements in one unit:

1. Electrochemical cell technology monitors carbon monoxide (CO) produced by smoldering fires;
2. A photoelectric (P) chamber senses airborne particulate for smoke detection;
3. Thermal (T) detection monitors temperature; and
4. Infrared (IR) sensing measures ambient light levels and flame signatures.

This cost reduction includes the cost of components as the price of one lead-type thermistor is more than four surface mounted thermistors. The manufacturing process cost is also less as the complete surface mounted mounting process can be accomplished with a unique production cell wherein multiple detector types can be produced for photo, thermal, and photo-thermal fire detectors. Additionally, multiple circuit board's can be manufactured simultaneously further reducing the time needed and manufacturing cost of the devices.

The devices of the present disclosure can also result in smaller device size and less and smaller packaging elements. For example, the present devices can affect a plastic parts reduction as a new, low profile detector cover for photo, thermal, and photothermal detectors can be used, and the current plastic element used to compensate directionality, in some photo-thermal detectors, can be eliminated.

In some proposed embodiments, the proposed mechanical solution integrates four surface mounted thermistors in a rectangular circuit board body with specific mechanical features in the detector cap (e.g., to direct air flow, protect the thermistor, and drain water away from it) and, in some embodiments, dedicated software compensates for the system thermal inertia that cannot be overcome by the physical design. The software can be stored in memory on the detector device and executable by a controller, such as a microprocessor. The processor and memory can be on the circuit board body, for example. The above features are features not possible in the prior art.

In one embodiment, a proposed surface mounted solution for thermal detection in fire sensors includes: four surface mounted thermistors (for example, 0603 NTC thermistors), mounted near the edge of the circuit board in the corners of a square or rectangular circuit board. In some embodiments, a square/rectangular shape of the circuit board provides a compact and consequently inexpensive circuit board panel layout with a suitable aperture pattern between them and the rest of the circuit board, to minimize the influence of the circuit board on the surface mounted thermistor in terms of thermal inertia. The use of at least two spaced apart thermistors can be beneficial, for example, as it can avoid directionality problems of the heat detector.

Further, in some embodiments, a mechanical configuration of the plastic parts (cover and base) of the fire detector can be provided with the surface mounted configuration on the circuit board in order to direct the air flow efficiently toward the surface mounted thermistor and assure a certain degree of protection to the circuit board and thermistor.

As discussed above, embodiments can also include dedicated software to correct the measured thermistor temperature on the basis of an air flow temperature model. This functionality can, for example, be used to compensate for the thermal inertia of a surface mounted configuration.

The air flow temperature model can be accomplished, for example, by measurements of the real air flow temperatures (inputs) and thermistors outputs of the real system. The dedicated software calculates an air flow temperature to feed the model of the system in order to minimize the difference between the effective measured temperature and the estimation of the thermistor temperature (e.g., using a Proportional Integral Observer (PIO) process). The parameters of the model can be stored in memory on the device.

In various embodiments, each thermistor has a measured temperature and each intermediate position has an estimated temperature. In such embodiments, each thermistor and each intermediate position can have a thermal inertia and the instructions stored in memory can apply a temperature compensation adjustment factor (e.g., determined through use of the POI process) to each estimated thermal inertia.

The type of data obtained by the dedicated software can be volatile integer data representing environment temperature. Additionally, this data can be stored in random access memory (RAM) and used for fire alarm generation or, at an application level, stored into a non-volatile RAM (NVRAM) or read only memory (ROM) for diagnostic purposes to evaluate the environmental temperature using different types of algorithms (e.g., average, mode, etc.). The PIO process can be used to estimate a temperature between physical thermistor locations. This data can also be provided, for example, to the fire system control panel.

In this detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is a bottom view of a point heat detector system with an outer cover and the detector cap removed that shows the corners of a circuit board with surface mounted thermistors provided therein, in accordance with one or more embodiments of the present disclosure.

Heat detectors are important components in some types of fire detection systems. Also, important are the controllers that provide the detection analysis, alarming functionality, based on data from the thermistors of the heat detector device, and communication functions with other fire system devices. The circuit board 103, designed according to the embodiments of the present disclosure, can provide these functions in one unitary circuit board.

In the implementation shown in FIG. 1, surface mounted thermistors 102-1, 102-2, 102-3, 102-4 are provided on the corners of the circuit board 103 of the heat detector device 100. In this manner, costs and manufacturing time and complexity can be reduced, among other benefits.

As shown in this embodiment, the sensors can be spaced angularly around a center point of the circuit board at intervals (e.g., at regular intervals such as every 90 degrees, every 45 degrees, etc.). These positions are referred to as corners as used herein. When used on a circular circuit board, the perimeter of the circle can circumscribe the corners of the polygon formed within the circle by the positions of the spaced sensors.

As illustrated in FIG. 1, the housing 106 of the heat detector device 100 also includes a number of cut out portions in side surfaces of the housing 106 to allow one or more corners of the circuit board to protrude out of the housing. In this manner, one or more thermistors 102 can be exposed to the air flow in the area to be monitored (air around the heat detector device 100, rather than the air within the housing 106.

FIG. 1 is a bottom view of a point heat detector with an outer housing removed that shows the corners of a circuit board with surface mounted thermistors provided therein, in accordance with one or more embodiments of the present disclosure. Such an embodiment can be used to provide directionality of a heat source that is detected by the thermistors.

For example, the system shown in FIG. 1 has four surface mounted thermistors mounted near the edges of the circuit board with a cover 106 being mounted thereon. Being that they are mounted on the corners of a rectangular (e.g., a square) circuit board 103, the angular difference is 90° between adjacent thermistors, with the thermistors reporting their data to a microcontroller (e.g., on the circuit board 103) to measure air temperature in four equally spaced directions.

To further refine the directionality detection, some embodiments can include a digital compass (e.g., Honeywell 1 axis low cost Magnetoresistive Sensors HMC1051), integrated in the heat detector device 100, to provide all installed detectors, regardless of their mounting orientation, a unique reference system (e.g., direction of Earth's magnetic field). Then, novel dedicated software described herein can be used to determine the direction of the air flow on the basis of the measurements of the four thermistors and the indication of the direction of Earth's magnetic field from the digital compass. This directionality concept will be discussed in more detail below.

The thermal inertia can be reduced, for example, due to the exposed corner design of the circuit board and to the plastic parts of the detector but the temperature measured by the thermistors can still be affected by a remaining thermal inertia. In order to increase the accuracy of the temperature measurement, a process based on the control system theory (e.g., unknown input and state observer) has been created to estimate the temperature of the space being monitored.

The heat detector device 100 can have programming to have an alarm threshold that is met when: the estimated temperature value at any time is greater than or equal to a temperature threshold (S point heat detectors) or when a function of the Rate of Rise of temperature is greater than or equal to a certain value (R point heat detectors). Accordingly, in this embodiment, there are several ways in which to quantify if an alarm should be initiated.

Air flow temperature measuring takes into account several phenomena, for instance, non-linear convection resistance (attributable to things like air speed and temperature difference), thermal conduction resistance, thermal capacitances due to the thermistors, and other elements of the system. The expectation is to estimate the air flow temperature by removing the other elements affecting the result due to system conditions. This can be accomplished using a mathematical model and system control theory. This can be an iterative process where each estimate is compared with a measured thermistor temperature and the estimate is revised to be closer to the measured thermistor temperature until there is very little difference between the measured and estimated thermistor temperatures.

The point heat detector analyzes this information to determine the direction that is the likely location of the heat source (fire), which can be used to direct emergency personnel and/or determine evacuation strategies, among other uses.

Heat flow direction processes utilizing mathematical algorithms can be very helpful in determining the location of a heat source.

One such process reads the sensed temperature at each thermistor 1, 2, 3, and 4. It then calculates a heat flow direction for example preliminarily down to 45 degrees based on balancing between two thermistors with heat readings. To further precision the location, the controller can determine a correction factor based on the temperature slope differences between adjacent thermistors. The detector then combines these values to calculate a more precise direction.

In some embodiments, digital compass data can also be used. Here, the digital compass data is determined and the non-compass direction data is then rotated to correlate to the digital compass reference direction information (e.g., to a due north digital compass reading). For instance, in some implementations, the point heat detector includes a digital compass and the controller combines data received from the thermistors and the digital compass to determine a direction of a heat source.

For the detector device illustrated in FIG. 1, the direction of a heat source can be pinpointed with an accuracy of 45 degrees (halfway between two thermistors oriented at a 90 degree angle to each other). For example, if thermistors 3 and 4 register elevated temperature readings, then the controller can determine whether the heat source is located in the direction C, D, or DC depending on if one or both of the sensed temperatures meet a threshold value indicating a heat source is near that thermistor. Alternatively, the evaluation can be based on if one or both of the slopes of the temperature data meet a threshold value indicating a heat source is near that thermistor. In some embodiments, this analysis can include determining that the changes in temperature are above a threshold when comparing the elevated temperature to that of a thermistor that is not elevated or is also elevated, but not to the level of the thermistor with the higher temperature.

In this embodiment, as described briefly above, the detector, via the controller, can calculate a correction factor that can further precision the direction determined by the analysis by the detector.

For example, an evaluation of the differences between temperature slopes (ROR: Rate of Rise of the outputs of the four thermistors) through a function DifROR(T1,T2, T3, T4) permits a calculation of a correction factor ß which is added to a (the determined direction based on the sensed temperature data that determined which thermistors had elevated readings) in order to obtain a more accurate evaluation of the heat flow direction (α'=α+ß).

A digital compass provides the installed detector, regardless of its mounting orientation, a unique reference system (direction of Earth's magnetic field): this results in a digital value corresponding to the angle q between the direction of Earth's magnetic field and a reference direction of the circuit board (e.g., the axis between the thermistor th1 and th4). Finally, a rotation of the reference system is applied (α"=α'+φ) in order to calculate the cardinal point CP (the most accurate determination of the heat flow direction). Accordingly, possible values of CP are: unknown direction, N, S, E, W, NE, NW, SE, SW.

As discussed, through use of the embodiments of the present disclosure point heat detectors can be more compact, easier and more cost effective to produce, with more uniformity between produced devices and less opportunity for human error and can be more accurate in detecting temperatures of air flow and in determining directions of heat sources. Such features can be very beneficial in detecting fires and alerting emergency personnel and building occupants early in a fire event, among other benefits.

In the embodiment of FIG. 1, the device is a heat point detector with four SMD thermistors. This configuration gives relevant advantages: lower cost of the heat sensitive elements, total automatic SMD mounting process of the thermistors (with higher reliability and lower cost of a manual mounting process of a lead thermistor). In particular, the four thermistors can be placed in the corners of a square circuit board or in the outer part of a circular circuit board.

In this manner, the angular coordinates of the thermistor positions respect the center of the detector, the angular distance between two adjacent thermistors is 90°. With this configuration, if the response of the heat detector is considered the maximum of the four thermistors readings, the responses are faster in the orientations corresponding to the four thermistors (0°, 90°, 180°, 270°, if 0° is considered the orientation corresponding to a thermistor) because the sensing element is frontally hit by the air flow, and slower in the intermediate position orientations (45°, 135°, 225°, 315°).

Further, it is also possible that the responses corresponding to the four thermistor orientations (0°, 90°, 180°, 270°) are not identical for the presence of different mechanical features. For example, the presence of a rotary switch with the corresponding plastic holder, or simply a different geometry of the detector case back under the thermistors can cause different thermal inertia in the four orientations. The presence of such asymmetries can also consequently cause different responses in the intermediate orientations (45°, 135°, 225°, 315°).

The response time of point heat detectors shall not be unduly dependent on the direction of air flow around them. To overcome or minimize this problem, some mechanical features can be implemented that help to direct part of the air flow toward the thermistors when the air flow is coming from an intermediate direction respect to the position of two neighboring thermistors.

This and similar mechanical solutions reduce the directional dependence of the heat detector response but have some limits and has a certain impact on the design of the detector cover. Further, if the responses in the four thermistor orientations (0°, 90°, 180°, 270°) are not identical, identical mechanical features cannot eliminate these asymmetries in the detector response.

In the previous designs of the system (proposed with the filed patent application Ser. No. 17/481,577, the disclosure of which is incorporated herein in its entirety) it could have been assumed that a symmetrical configuration, where all the four thermistors have the same thermal inertia would have identical responses. With this hypothesis the responses are the same every 90°, with a more sensitive orientation at 0° (because the sensing element is frontally hit by the air flow) and a less sensitive orientation at 45° (intermediate orientation between two thermistors and thereby the thermistors are not frontally hit by the air flow).

In the previous disclosure, a concept called the proportional integral observer was utilized for one thermistor and identical responses were assumed for all four thermistors. Within this assumption, only three parameters were sufficient to identify the system model and to so implement the proportional integral observer model.

But in actual implementation, it is likely that the real parameters of each thermistor are different, and directionality issues could arise for different reasons. For example, intermediate directions (45°, 135°, 225°, 315° located between thermistor locations) are intrinsically less sensitive than orientations corresponding to thermistors (0°, 90°, 180°, 270°) where sensing elements (thermistors) are frontally hit by the air flow and can also be less sensitive in a different proportion to each other based upon their position with respect to the air flow.

Each thermistor could also have a different thermal inertia because there could be a different geometry of the housing or other heat detector device structures near them. For example, the presence of rotary switches under two thermistors and/or different mechanical configurations of the chamber base or the case back near the four thermistors may change the thermal inertia of nearby thermistors. Some mechanical features (e.g., of the detector housing or detector cap, not shown) can mitigate the directionality phenomenon, but such efforts can be expensive in terms of development activity and custom mechanical solutions needed for every new detector design often may not be compatible with aesthetic and/or other functional requirements.

The embodiments of the present disclosure provide a modeling of a heat detector with four thermistors implemented via firmware and can be used to reduce thermal directionality error regardless of the mechanical configuration adopted. The present embodiments can, for example, be utilized as a firmware or software application and, as such, can be an inexpensive and flexible solution that permits to use four SMD thermistors (a configuration less expensive than one through hole thermistor) without problems of directionality. It can also be used for a configuration with two through-hole thermistors where the solution with one through-hole thermistor, for the presence of particular mechanical features due to the self-test cell, is not possible due to problems of directionality.

Figure 2:
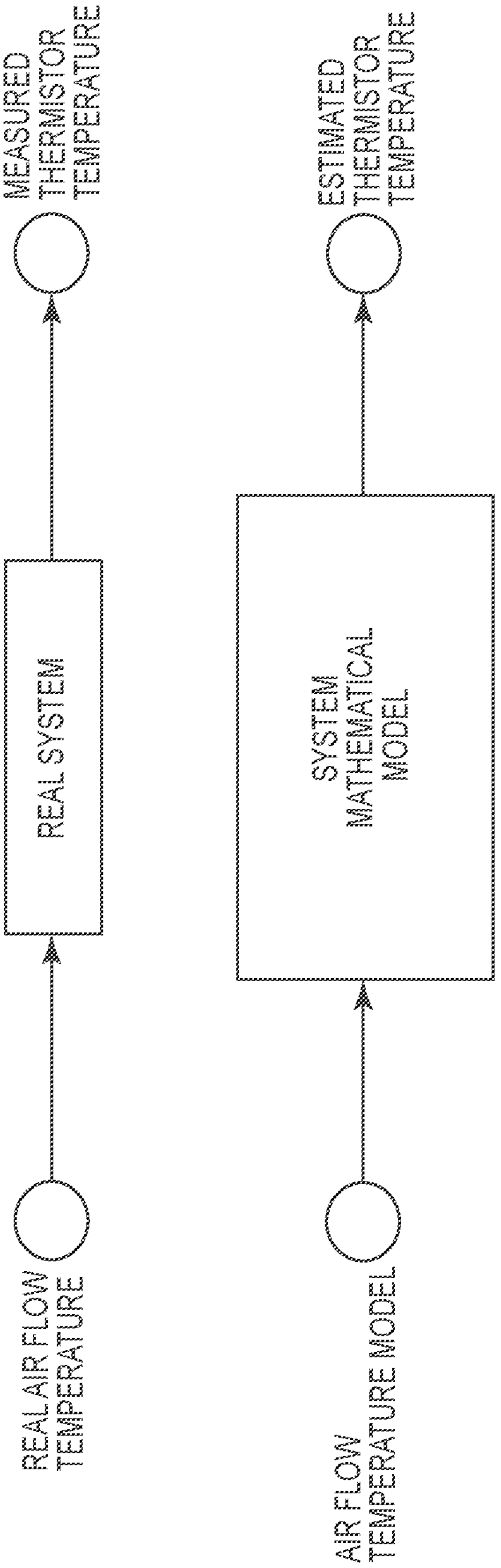
FIG. 2 is a schematic illustrating the actual process and the estimation process for determining the thermistor temperature within a space monitored by the point heat detector in accordance with one or more embodiments of the present disclosure.

FIG. 2 is a schematic illustrating the actual process and the estimation process for determining the thermistor temperature within a space monitored by the point heat detector in accordance with one or more embodiments of the present disclosure.

In this process, the physical state of the system (indirect angular directions, e.g., 45 degrees, cannot be determined by direct observation. Instead, indirect effects on the indirect directional system are observed by way of the system outputs. If a system is observable, it is possible to reconstruct the system state from its output measurements using the state observer. In control theory, a state observer is a system that provides an estimate of the internal state of a given real system, from measurements of the input and output of the real system. From this, an air flow temperature can be calculated to feed a mathematical model of the system in order minimize a difference between the measured and estimated thermistor temperatures.

In the example of FIG. 2, a real system measurement is shown at 210, wherein the real air flow temperature is represented at 214. It interacts with the real system 216 including at least one thermistor. This process could be accomplished with thermistors neighboring an intermediate angle (e.g., 45 degrees) between two thermistors (e.g., at 0 degrees and 90 degrees). This analysis could be done for each neighboring thermistor. As illustrated, the one or more thermistors measure the temperature at their location 218.

Also shown at 220 is a modeling system that estimates a thermistor temperature. Here, data is fed to the model representing an estimated air flow at 224. The system mathematical model 226 is designed to mimic what occurs in the real world when the air flow and thermistor interact and the model produces an estimated thermistor temperature at 228.

In some embodiments, machine learning can be utilized to adjust the system mathematical model to improve its accuracy. This can, for example, be accomplished by recursively comparing the estimated thermistor temperature with the measured thermistor temperature, adjusting parameters in the model, and doing the comparison again until the estimated thermistor temperature and the measured thermistor temperature results are within a threshold value of accuracy.

For example, in some embodiments, the controller compares a measured thermistor temperature with an estimated thermistor temperature to determine a model thermistor temperature. The controller determines a difference value by comparing a measured thermistor temperature with an estimated thermistor temperature. The controller then uses the difference value to update a sensor model and the controller uses the difference value to update an air flow temperature estimating model.

Figure 3:
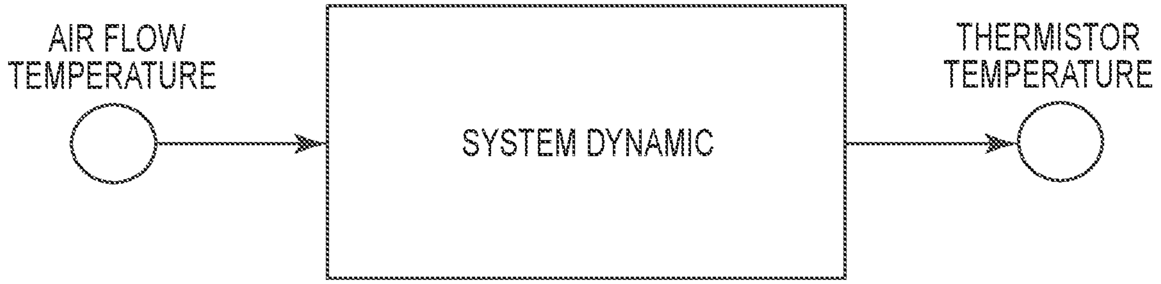
FIG. 3 is a schematic illustrating a dynamic system process for determining the thermistor temperature within a space monitored by the point heat detector in accordance with one or more embodiments of the present disclosure.

FIG. 3 is a schematic illustrating a dynamic system process for determining the thermistor temperature within a space monitored by the point heat detector in accordance with one or more embodiments of the present disclosure. FIG. 3 represents that when the modeling has been sufficiently refined for accuracy, the resultant analysis 330 is the same for both, the real world measurements and the estimated measurements. Here, an air flow temperature 334, whether real or estimated, is given to the system 336, and an accurate thermistor temperature 338 can be ascertained.

Figure 4:
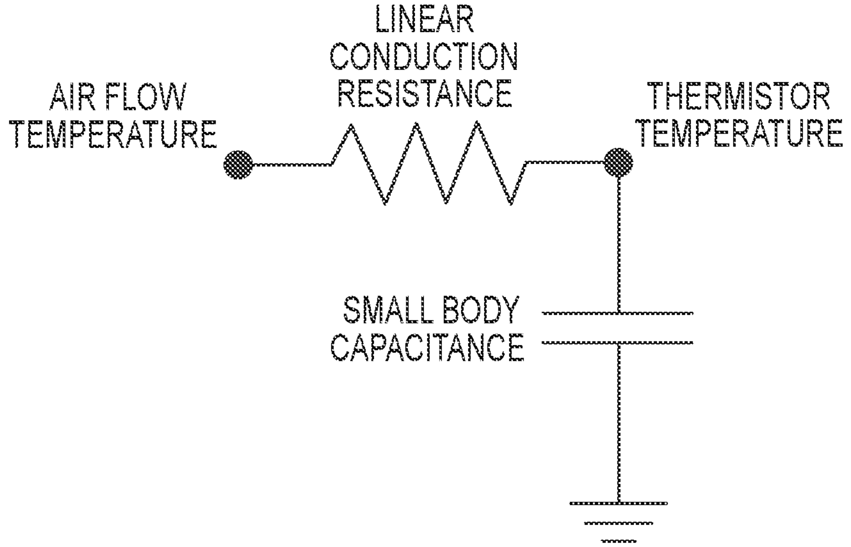
FIG. 4 is a circuit diagram illustrating a reduced model of the thermistor in accordance with one or more embodiments of the present disclosure.

FIG. 4 is a circuit diagram illustrating a reduced model of the thermistor in accordance with one or more embodiments of the present disclosure. The model utilized for the estimation of thermistor temperature mimics a circuit 440 such as that shown in FIG. 4, having an input air flow temperature 442, a linear conduction resistance 444 that results in a thermistor temperature 446 that is held from a ground state 449 by a capacitor 448. This model is beneficial as it is a single pole method, has a unitary gain, and utilizes a time component value wherein the dominant time constant can be $T_{dom}$=R*C of the thermistor model (characteristic response time of the thermistor), among other benefits.

Figure 5:
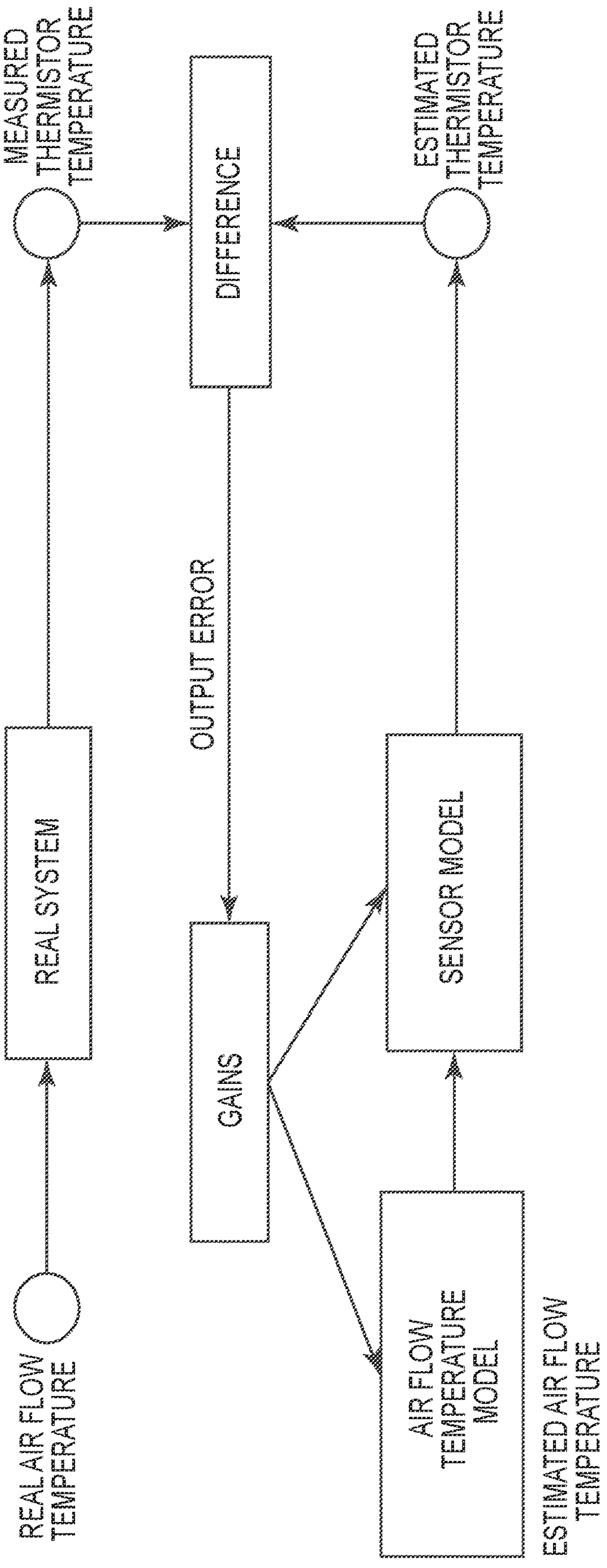
FIG. 5 is a schematic illustration of a difference analysis engine in accordance with one or more embodiments of the present disclosure.

FIG. 5 is a schematic illustration of a difference analysis module in accordance with one or more embodiments of the present disclosure. This analysis module illustrates a calculation of a temperature via a proportional integral observer model for one thermistor.

In an example to illustrate why such a methodology may be beneficial, in real world testing it was observed that the responses of two thermistors (T3→270° and T4→180°) located near the rotary switches on a detector device were slower because of the presence of more plastic/non-thermistor device material that causes a higher thermal inertia of the corresponding neighboring thermistors: in general, the asymmetries in the shape and/or placement of non-thermistor device components can create a different response of the neighboring thermistors.

This phenomenon can be mitigated by a reduced model, as discussed herein, for every thermistor wherein the model takes into account its particular thermal inertia. Further, an additional temperature compensation term can be utilized that, for orientations not coincident with the thermistor's positions (angles not having thermistors at them), compensates the higher thermal inertia of that configuration using the information, for example, from the two closest thermistors.

For instance, an algorithm such as:

$$\begin{pmatrix} \hat{x}_{n+1} \\ \hat{d}_{n+1} \end{pmatrix} = \begin{pmatrix} A - K_1 C & E \\ -K_2 C & I \end{pmatrix} \begin{pmatrix} \hat{x}_n \\ \hat{d}_n \end{pmatrix} + \begin{pmatrix} K_1 \\ K_2 \end{pmatrix} (y_n)$$

can be utilized to estimate the air flow temperature based on the measured temperatures by one thermistor. In some embodiments, this calculation can be made for each thermistor and in other embodiments, the same response can be used for multiple or all thermistors. The components of the above formula include:

where:

A: state transition matrix (e.g., a pure number); calculated as $$T_{dom}/(T_{dom}+1)$$

E: unknown input matrix (e.g., pure number); calculated as $$1/(T_{dom}+1)$$

C: output matrix coefficient (e.g., C=1)

A and E depend on $T_{dom}$ $T_{dom}$: dominant time constant of the thermistor model (characteristic response time of the thermistor)

$K_1$: retroaction gain in the thermistor's temperature evaluation (state under observation)

$K_2$: retroaction gain in the air flow temperature evaluation (augmented state in the model)

$y_n$: current thermistor measure $x_n$: estimated current thermistor temperature $x_{n+1}$: new estimated thermistor temperature $d_n$: estimated current air flow temperature $d_{n+1}$: new estimated air flow temperature.

Accordingly, the model for one thermistor can be determined with three constants: $T_{dom}$, $K_1$, and $K_2$.

The procedure to obtain the model of the thermistor temperature estimation system, in terms of response to the air flow, can be applied to every thermistor. In this way, the estimation system includes four models that describe the responses of the detector device from the four main orientations (0°, 90°, 180°, 270°).

With this generalization determined and data store in memory, possible asymmetries of the design of the detector device due, for example to the presence of different amounts of material near the thermistors (e.g., due the presence of specific components like self-test cells, rotary switches, etc.), can be taken into account. The estimation and measurement system is characterized by 12 (4 thermistors×3 parameters ($T_{dom}$, $K_1$, and $K_2$)) parameters stored in memory (e.g., the detector device electrically erasable programmable read-only memory (EEPROM) or other memory location within the detector device).

As discussed above, an additional temperature compensation term (ΔT1) can be utilized that, for orientations not coincident with the thermistor's positions (angles not having thermistors at them), compensates for the higher thermal inertia of such configurations. For example, $$T1_n = T1_{est} + \Delta T1, \text{ where:}$$

$$\Delta T1 = \max\left(\left(T2_{est} * RoR_2/K_{adj2}\right), \left(T3_{est} * RoR_3/K_{adj3}\right)\right)$$

$$T_{max} = \max(T1_n, T2_n, T3_n, T4_n)$$

and, where:

$T_{iest}$: air flow temperature estimated by thermistor i using its PI Observer model RoR i: Rate of Rase of thermistor i (the rate by which the temperature increases)

Kadj i: compensation coefficient related to thermistor i $Ti_n$: air flow temperature estimated by thermistor i using PIO model and directionality compensation Tmax: air flow temperature estimated by the heat detector In an example embodiment having four thermistors, the four compensation coefficients Kadj can, for instance, be stored in memory in the detector device, for example, in an EEPROM.

Different types of heat detectors can be constructed such that the thermal inertia of the thermistors may be different from one heat detector type to another. For example, a wired and a wireless heat detectors may each have a set of thermistors and one of the sets of thermistors may have different thermal inertia with respect to the other set. Heat detectors to be used in different countries may have different thermal inertia based on different laws that may affect the type component materials that can be used around the thermistors and/or placement of component near the thermistor, among other factors that may affect the thermal inertia.

These issues may make configuring or manufacturing the heat detectors difficult as the software/firmware may be different to set up each type of detector device. To mitigate or eliminate this issue and other issues discussed herein, a proportional integral observer model for each thermistor can be deduced that takes into account its particular thermal inertia and its particular interaction with the air flow contacting the thermistor.

As discussed herein, the proportional integral observer model can be calculated for each thermistor independently, in some embodiments. However, for sets of thermistors that are being installed in the same type of heater the proportional integral observer model can be calculated once and applied to all thermistors of that type of detector device, in other embodiments.

In such a calculation of the proportional integral observer model where the air flow temperature is estimated based on the measurement at the particular thermistors. These measurements can be done in lab conditions, during installation or commissioning, or during initial use after being put into service.

Also, as discussed, the intermediate positions between adjacent thermistors will have weaker thermal inertia than positions having a thermistor interacting directly with the air flow contacting a particular thermistor. Accordingly, a temperature compensation adjustment factor can be added to the proportional integral observer model to compensate for this weakness (e.g., the presence of detector device components between the thermistors adjacent a particular intermediate position and the intermediate position).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A point heat detector of a fire sensing system, comprising:

a circuit board body having a number of corners;

at least two surface mounted thermistors, wherein each of the at least two surface mounted thermistors are mounted on a different corner of the number of corners;

an intermediate position between two of the at least two surface mounted thermistors; and a processor that executes instructions stored in memory to:

determine a temperature for at least one of the at least two surface mounted thermistors; and determine an estimated temperature for the intermediate position between the two of the at least two surface mounted thermistors using a proportional integral observer (PIO) process.

2. The point heat detector of claim 1, wherein the processor is firmware.

3. The point heat detector of claim 1, wherein the processor and memory are on the circuit board body.

4. The point heat detector of claim 1, wherein the temperature is a measured temperature.

5. The point heat detector of claim 1, wherein each of the at least two surface mounted thermistors have a measured temperature.

6. The point heat detector of claim 1, wherein each of the at least two surface mounted thermistors and the intermediate position have a thermal inertia and wherein the processor executes the instructions stored in the memory to apply a temperature compensation adjustment factor to each thermal inertia.

7. The point heat detector of claim 1, wherein a calculation of the temperature is calculated via a proportional integral observer model.

8. The point heat detector of claim 1, wherein the intermediate position has an estimated thermal inertia calculated from the estimated temperature.

9. The point heat detector of claim 1, wherein the circuit board body has a surface mounted thermistor of the at least two surface mounted thermistors mounted at each corner of the circuit board body.

10. The point heat detector of claim 9, wherein the point heat detector has intermediate positions including the intermediate position defined between each of the at least two surface mounted thermistors.

11. A point heat detector of a fire sensing system, comprising:

a circuit board body having a number of corners;

at least two surface mounted thermistors, wherein each of the at least two surface mounted thermistors are mounted on a different corner of the number of corners;

an intermediate position between two of the at least two surface mounted thermistors; and a processor that executes instructions stored in memory to:

determine a temperature for at least one of the at least two surface mounted thermistors;

determine an estimated temperature for the intermediate position between the two of the at least two surface mounted thermistors using a proportional integral observer (PIO) process;

determine a thermal inertia for each of the at least two surface mounted thermistors and the intermediate position;

determine a temperature compensation adjustment factor to each thermal inertia; and apply the temperature compensation adjustment factor to the estimated temperature.

12. The point heat detector of claim 11, wherein a controller analyzes a time value that data was received to determine a direction of a heat source.

13. The point heat detector of claim 12, wherein the controller compares data received from the thermistors to determine the direction of the heat source.

14. The point heat detector of claim 12, wherein the point heat detector has surface mounted thermistors mounted on four corners and wherein the controller combines data received from the thermistors to determine the direction of the heat source.

15. The point heat detector of claim 12, wherein the point heat detector includes a digital compass and wherein the controller combines data received from the thermistors and the digital compass to determine the direction of the heat source.

16. A point heat detector of a fire sensing system, comprising:

a circuit board body having a number of corners;

at least two surface mounted thermistors, wherein each of the at least two surface mounted thermistors are mounted on a different corner of the number of corners;

an intermediate position between two of the at least two surface mounted thermistors; and a processor that executes instructions stored in memory to:

determine a temperature for at least one of the at least two surface mounted thermistors;

determine an estimated temperature for the intermediate position between the two of the at least two surface mounted thermistors using a proportional integral observer (PIO) process;

determine a thermal inertia for each of the at least two surface mounted thermistors and the intermediate position;

determine a temperature compensation adjustment factor to each thermal inertia through use of the PIO process; and apply the temperature compensation adjustment factor to the estimated temperature.

17. The point heat detector of claim 16, wherein a controller compares a measured thermistor temperature with an estimated thermistor temperature to determine a model thermistor temperature.

18. The point heat detector of claim 17, wherein the controller determines a difference value by comparing the measured thermistor temperature with the estimated thermistor temperature.

19. The point heat detector of claim 18, wherein the controller uses the difference value to update a sensor model.

20. The point heat detector of claim 18, wherein the controller uses the difference value to update an air flow temperature estimating model.

* * * * *